(12) United States Patent
Kim

(10) Patent No.: US 11,027,714 B2
(45) Date of Patent: Jun. 8, 2021

(54) BRAKE APPARATUS FOR VEHICLE

(71) Applicant: HYUNDAI MOBIS Co., Ltd., Seoul (KR)

(72) Inventor: Jong Sung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 143 days.

(21) Appl. No.: 16/108,162

(22) Filed: Aug. 22, 2018

(65) Prior Publication Data
US 2019/0061721 A1    Feb. 28, 2019

(30) Foreign Application Priority Data
Aug. 30, 2017   (KR) .................. 10-2017-0110022

(51) Int. Cl.
| | | |
|---|---|---|
| *B60T 8/40* | (2006.01) | |
| *G05G 5/03* | (2008.04) | |
| *B60T 11/232* | (2006.01) | |
| *B60T 11/236* | (2006.01) | |

(52) U.S. Cl.
CPC ............. *B60T 8/409* (2013.01); *B60T 11/232* (2013.01); *B60T 11/236* (2013.01); *G05G 5/03* (2013.01); *B60T 2220/04* (2013.01); *B60T 2270/82* (2013.01)

(58) Field of Classification Search
CPC .. B60T 8/409; B60T 2270/82; B60T 2220/04; B60T 8/441; B60T 8/446; B60T 8/447; B60T 8/448; G05G 5/03
See application file for complete search history.

(56) References Cited

U.S. PATENT DOCUMENTS

| | | | | |
|---|---|---|---|---|
| 4,524,585 A | * | 6/1985 | Coll, V ................... | B60T 11/20 60/562 |
| 6,848,257 B2 | * | 2/2005 | Bacardit ............... | B60T 11/236 60/562 |
| 6,935,112 B2 | * | 8/2005 | Koshimizu ........... | B60T 11/236 60/588 |
| 7,344,203 B2 | * | 3/2008 | Tsubouchi .............. | B60T 11/16 188/358 |
| 9,487,198 B2 | | 11/2016 | Kim et al. | |
| 2005/0236892 A1 | * | 10/2005 | Kusano ................. | B60T 8/4081 303/116.1 |
| 2015/0115701 A1 | * | 4/2015 | Koo ....................... | B60T 11/224 303/20 |

FOREIGN PATENT DOCUMENTS

KR    10-2014-0104298    8/2014

* cited by examiner

*Primary Examiner* — Xuan Lan Nguyen
(74) *Attorney, Agent, or Firm* — H.C. Park & Associates, PLC

(57) ABSTRACT

A brake apparatus for a vehicle may including: a cylinder including a supply flow path to supply working fluid of a reservoir and a hydraulic chamber connected to the supply flow path; a piston movably installed in the cylinder, and connected to a brake pedal; an elastic member installed in the hydraulic chamber so as to elastically support the piston; a sealing member installed on the outer surface of the piston so as to be in contact with the inner surface of the hydraulic chamber; and a communication flow path formed on the inner surface of the cylinder along the longitudinal direction of the cylinder, and guiding the working fluid of the hydraulic chamber to the opposite side of the moving direction of the piston, when the piston is moved.

7 Claims, 7 Drawing Sheets

# BRAKE APPARATUS FOR VEHICLE

CROSS-REFERENCES TO RELATED APPLICATIONS

This application claims priority from and the benefit of Korean Application No. 10-2017-0110022, filed on Aug. 30, 2017, which is hereby incorporated by reference for all purposes as if set forth herein.

BACKGROUND

Field

Exemplary embodiments relate to a brake apparatus for a vehicle, and more particularly, to a brake apparatus for a vehicle, which can enable a driver to easily feel a pedal feel when a brake pedal is pressurized, and prevent a change in braking performance depending on a change in temperature or humidity.

Discussion of the Background

Recently, much attention has been paid to the eco-friendly vehicle technology including an electrical vehicle, the enhanced safety features, the autonomous navigation vehicle technology and the like. Therefore, the application of the brake-by-wire system to a brake system for a vehicle has rapidly spread.

The brake-by-wire system does not use a pedal force of a driver or a boosting force of a vacuum booster when generating a braking force, but senses how strongly the driver steps on the brake pedal, through a sensor, and drives a motor or electric energy to generate a required braking force. The brake-by-wire system may include various systems such as an electro-hydraulic braking (EHB) system, an e-booster and an electronic brake system (EMB), which require a brake pedal simulator in common.

The brake pedal simulator provides a user with a virtual feeling using a rubber damper or spring, and the force by which the driver steps on the brake pedal is blocked from a braking force. Therefore, although the braking force is actively generated in case of the necessity, the changed braking force has no influence on the brake feeling.

However, when the conventional brake pedal simulator implements a pedal simulator function using a rubber damper, the brake pedal feel of the rubber damper may be varied by the ambient temperature or humidity, because the characteristic of the rubber damper is changed depending on the temperature or humidity. Furthermore, since the rubber damper is hardened when used for a long time, the durability or braking performance of the brake apparatus may be reduced.

Furthermore, when the conventional brake pedal simulator implements the pedal simulator function using a spring, there is almost no difference in pedal force between when the brake pedal is pressurized and when the brake pedal is depressurized. Thus, when depressurizing the brake pedal, a driver may not have a proper brake pedal feel. In this case, the driver may feel uncomfortable while operating the braking pedal.

Therefore, there is a demand for a device capable of solving the problem.

The related art of the present invention is disclosed in Korean Patent Publication No. 2014-0104298 published on Aug. 28, 2014, and entitled "Brake pedal simulator of active brake apparatus".

The above information disclosed in this Background section is only for enhancement of understanding of the background of the invention and, therefore, it may contain information that does not constitute prior art.

SUMMARY

Exemplary embodiments of the present invention are directed to a brake apparatus for a vehicle, which can enable a driver to easily feel a pedal feel when a brake pedal is pressurized, and prevent a change in braking performance depending on a change in temperature or humidity.

An exemplary embodiment provides a brake apparatus for a vehicle including: a cylinder including a supply flow path to supply working fluid of a reservoir and a hydraulic chamber connected to the supply flow path; a piston movably installed in the cylinder, and connected to a brake pedal; an elastic member installed in the hydraulic chamber so as to elastically support the piston; a sealing member installed on the outer surface of the piston so as to be in contact with the inner surface of the hydraulic chamber; and a communication flow path formed on the inner surface of the cylinder along the longitudinal direction of the cylinder, and guiding the working fluid of the hydraulic chamber to the opposite side of the moving direction of the piston, when the piston is moved.

The hydraulic chamber may include: a first hydraulic chamber accommodating an end portion of the piston, and having the communication flow path formed therein; and a second hydraulic chamber having a smaller diameter than the first hydraulic chamber, and connected to the supply flow path.

The sealing member may divide the first hydraulic chamber into two spaces when the piston is moved.

When the piston is pressurized by the brake pedal, a first space in the first hydraulic chamber may be gradually decreased, and a second space in the first hydraulic chamber may be gradually increased.

The piston may have a division ring protruded from the end portion thereof, and the sealing member may be installed on the division ring.

The sealing member may have a larder size than the inner diameter of the first hydraulic chamber and the outer diameter of the division ring.

A first sealing cup may be installed on the inner surface of the second hydraulic chamber between the supply flow path and the first hydraulic chamber, the piston may have a piston chamber to communicate with the first hydraulic chamber, and the piston chamber may have a cut-off hole to communicate with the supply flow path.

The plurality of cut-off holes may be formed along the circumferential direction of the piston chamber.

The cut-off hole may cause the working fluid of the piston chamber to flow toward the supply flow path in a section between the first sealing cup and the supply flow path.

The brake apparatus may further include a second sealing cup installed on the inner surface of the second hydraulic chamber at the opposite side of the first sealing cup based on the supply flow path.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Hereafter, a brake apparatus for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
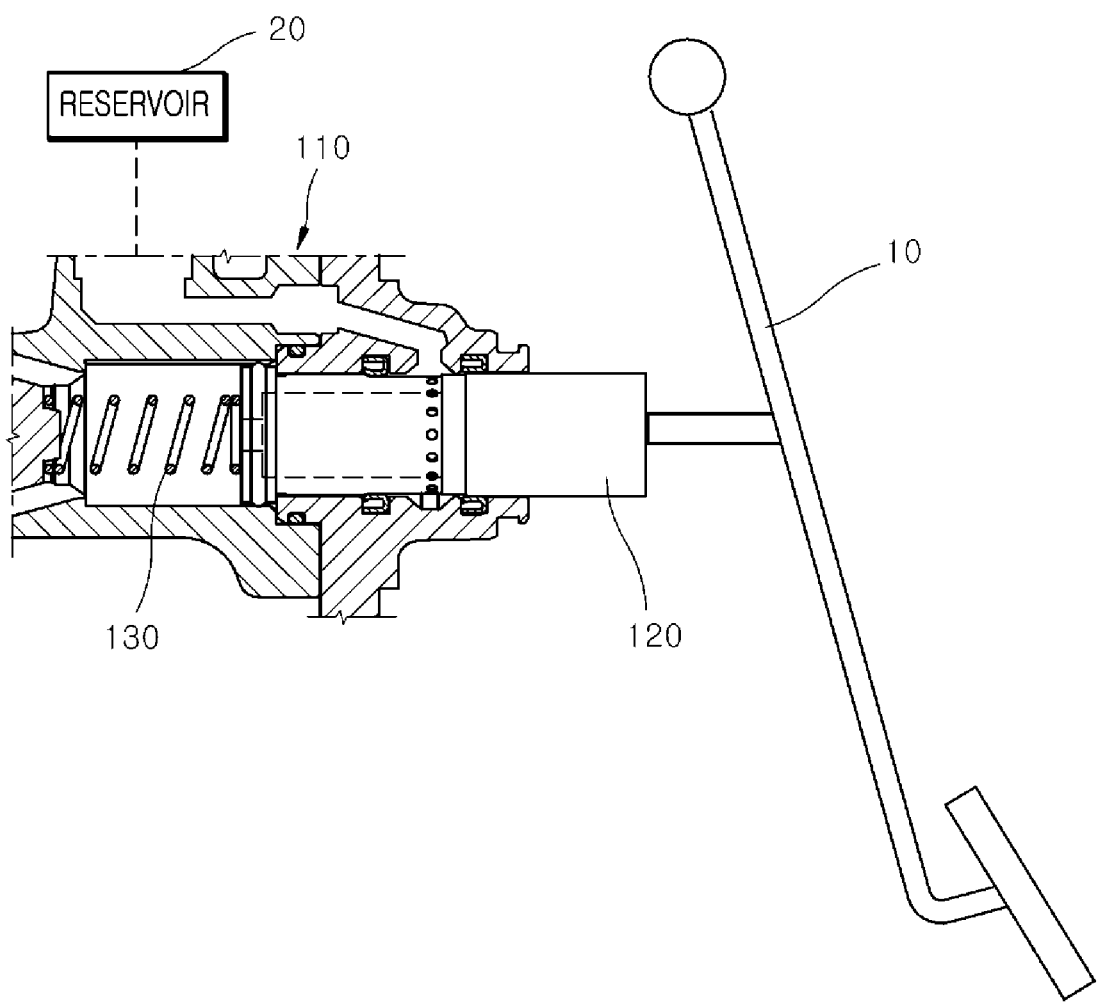
FIG. 1 is a cross-sectional view illustrating a brake apparatus for a vehicle in accordance with an embodiment of the present invention.
Figure 2:
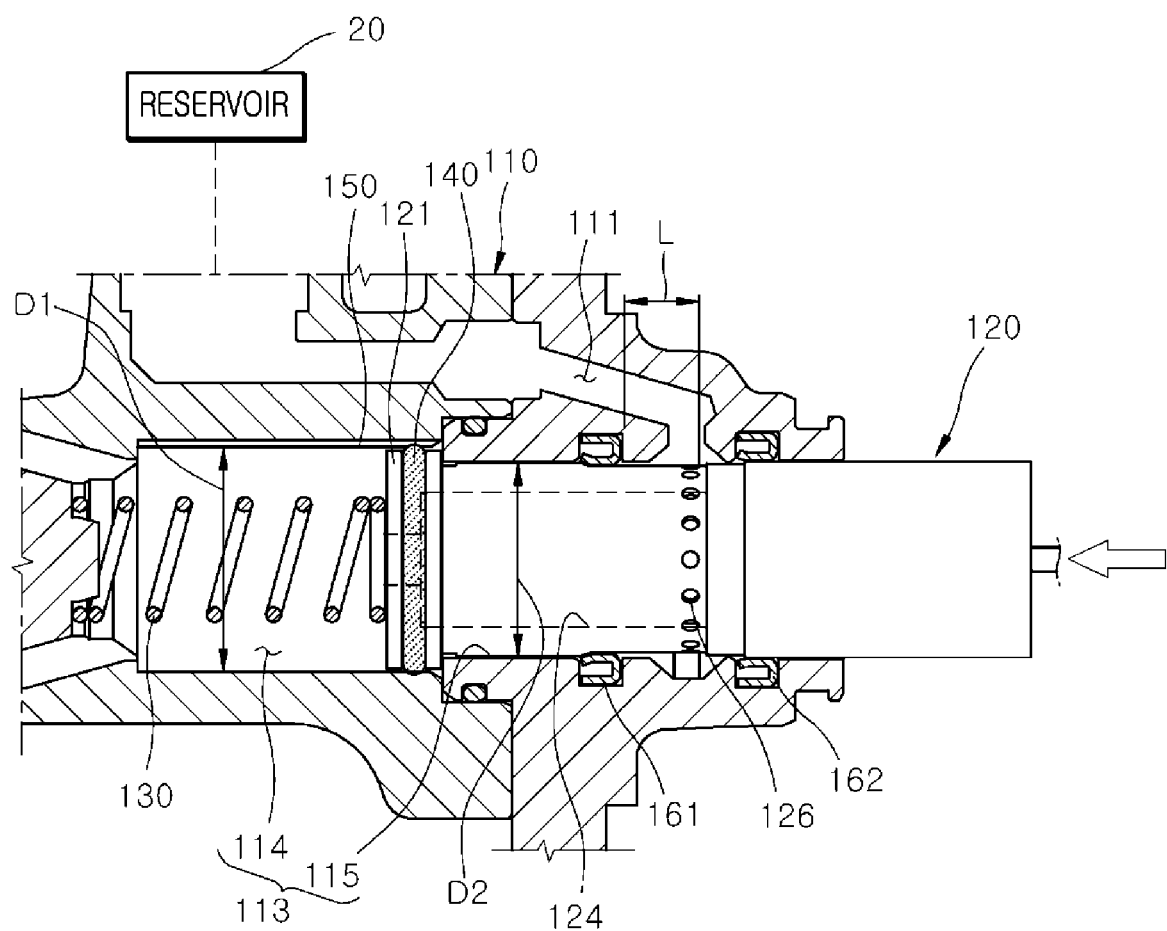
FIG. 2 is a cross-sectional view illustrating the structure of the brake apparatus for a vehicle in accordance with the embodiment of the present invention.
Figure 3:
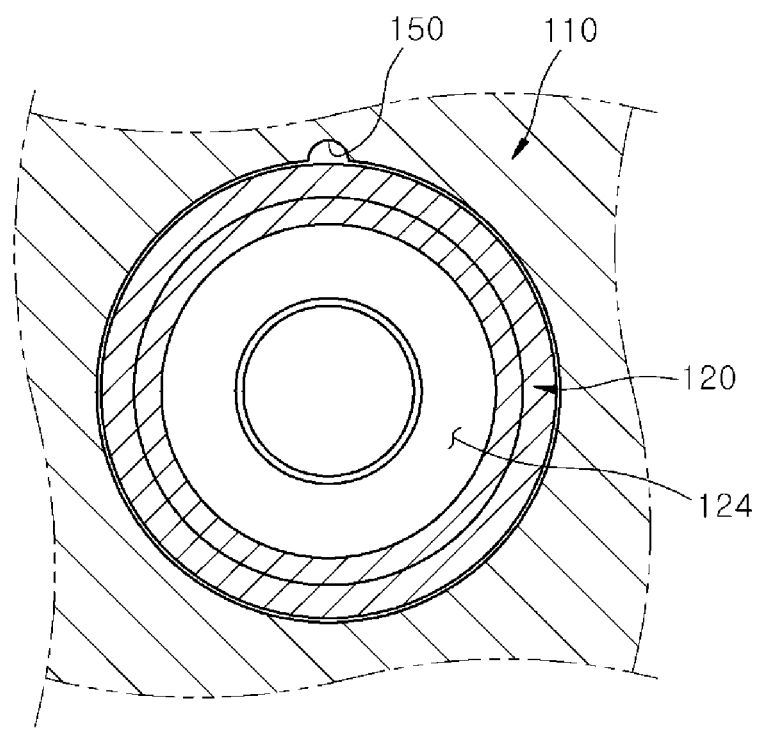
FIG. 3 is a cross-sectional view illustrating a communication flow path in the brake apparatus for a vehicle in accordance with the embodiment of the present invention.

FIG. 1 is a cross-sectional view illustrating a brake apparatus for a vehicle in accordance with an embodiment of the present invention, FIG. 2 is a cross-sectional view illustrating the structure of the brake apparatus for a vehicle in accordance with the embodiment of the present invention, and FIG. 3 is a cross-sectional view illustrating a communication flow path in the brake apparatus for a vehicle in accordance with the embodiment of the present invention.

Referring to FIGS. 1 to 3, the brake apparatus for a vehicle in accordance with the embodiment of the present invention may include a cylinder 110, a piston 120, an elastic member 130, a sealing member 140 and a communication flow path 150.

The cylinder 110 may include a supply flow path 111 to supply working fluid of a reservoir 20 and a hydraulic chamber 113 connected to the supply flow path 111. The hydraulic chamber 113 may include first and second hydraulic chambers 114 and 115.

The first hydraulic chamber 114 may accommodate an end portion of the piston 120, and have the communication flow path 150 formed therein. The second hydraulic chamber 115 may have a smaller diameter than the first hydraulic chamber 114 (D1>D2), and the supply flow path 111 may be connected to the second hydraulic chamber 115. The boundary portion between the first and second hydraulic chambers 114 and 115 may be formed with a stepped portion. As a division ring 121 of the piston 120 is caught on the boundary portion of the second hydraulic chamber 115, the piston 120 can be prevented from be separated from the second hydraulic chamber 115. The division ring 121 may be formed in a circular shape.

The piston 120 may be movably installed in the cylinder 110, and a brake pedal 10 may be connected to the piston 120.

The division ring 121 may be protruded from the end portion of the piston 120, and the sealing member 140 is fitted onto the division ring 121. The division ring 121 may divide the space of the first hydraulic chamber 114 into first and second spaces 114a and 114b (refer to FIG. 6), based on the division ring 121, when the piston 120 is moved.

At this time, the sealing member 140 may be fitted into a division groove (not illustrated) of the division ring 121, and prevent working fluid from passing through a gap between the outer surface of the division ring 121 and the inner surface of the first hydraulic chamber 114. The sealing member 140 may have a size which is smaller than the inner diameter D1 of the first hydraulic chamber 114 and slightly smaller than the outer diameter of the division ring 121. Such a sealing member 140 may neither completely seal the space between the outer circumference of the piston 120 and the inner surface of the first hydraulic chamber 114, nor generate sliding resistance of the piston 120.

The elastic member 130 may be installed in the hydraulic chamber 113 so as to elastically support the piston 120. The elastic member 130 may include a coil spring. Since the elastic member 130 is installed to elastically support the piston 120, it is possible to prevent a change in elastic force of the elastic member 130 even though the ambient temperature or humidity is changed. Furthermore, although the elastic member 130 is used for a long time, it is possible to prevent a reduction in durability or braking performance of the brake apparatus.

The sealing member 140 may be installed on the outer surface of the piston 120 so as to be in contact with the inner surface of the hydraulic chamber 113. The sealing member 140 may include an O-ring to surround the outer surface of the piston 120.

The sealing member 140 may divide the first hydraulic chamber 114 into two spaces 141a and 141b, when the piston 120 is moved. When the piston 120 is pressurized by the brake pedal 10, the first space 114a may be gradually decreased, and the second space 114b may be gradually increased. On the other hand, when the external force applied to the piston 120 is removed, the first space 114a may be gradually increased, and the second space 114b may be gradually decreased.

At this time, since the first hydraulic chamber 114 is divided into two spaces 141a and 141b based on the sealing member 140 when the piston 120 is moved, the piston 120 may be moved toward the first hydraulic chamber 114 (left in FIG. 2) when the brake pedal 10 is pressurized. Therefore, since the working fluid of the first hydraulic chamber 114 flows to the second space 114b through the communication flow path 150, the working fluid may cause sliding resistance on the piston 120, or apply a damping force to the piston 120 to delay the movement of the piston 120.

When the pressurization of the brake pedal 10 is removed, the piston 120 may be moved toward the second hydraulic chamber 115 (right in FIG. 2). Therefore, since the working fluid of the second space 114b flows to the first space 114a of the first hydraulic chamber 114 through the communication flow path 150, the working fluid may also cause sliding resistance on the piston 120 or apply a damping force to the piston 120 to delay the return of the piston 120, when the piston 120 is returned to the original position.

Since the working fluid of the first hydraulic chamber 114 flows to the first and second spaces 114a and 114b through the communication flow path 150 when the piston 120 is pressurized and depressurized, a driver may feel a larger force than the elastic force of the elastic member 130 when the piston 120 is pressurized, and feel a smaller force than the elastic force of the elastic member 130 when the piston 120 is depressurized. In this case, a hysteresis characteristic in which a difference in pedal feel (pedal force) is caused when the brake pedal 10 is pressurized and depressurized can be implemented. Therefore, the driver can easily feel the difference in pedal feel, and thus easily operate the brake pedal 10 (refer to FIG. 7).

The communication flow path 150 may be formed on the inner surface of the cylinder 110 along the longitudinal direction of the cylinder 110. When the piston 120 is moved, the communication flow path 150 may guide the working fluid of the hydraulic chamber 113 to the opposite side of the moving direction of the piston 120. Since the working fluid of the hydraulic chamber 113 is moved to the opposite side of the moving direction of the piston 120 through the communication flow path 150, the working fluid may apply a damping force to the piston 120 when the brake pedal 10 is pressurized or depressurized. Furthermore, since the orifice effect is maximized when the working fluid is moved through the communication flow path 150, the damping effect of the brake apparatus for a vehicle can be expected.

The first sealing cup 161 may be installed between the supply flow path 111 and the first hydraulic chamber 114 on the inner surface of the second hydraulic chamber 115, and the piston 120 may include a piston chamber 124 to communicate with the first hydraulic chamber 114 and a cut-off hole 126 to communicate with the supply flow path 111. The first sealing cup 161 may prevent the working fluid from passing through a gap between the second hydraulic chamber 115 and the piston 120. The first sealing cup 161 may have a U-shaped cross-section of which the opened portion faces the first hydraulic chamber 114.

Since the cut-off hole 126 is formed in the piston 120 and the piston chamber 124 communicates with the first hydraulic chamber 114 and the supply flow path 111, the working fluid of the first hydraulic chamber 114 may be discharged to the supply flow path 111 through the piston chamber 124 and the cut-off hole 126 before the cut-off hole 126 passes the first sealing cup 161, when the piston 120 is moved. That is, the cut-off hole 126 may move the working fluid of the piston chamber 124 toward the supply flow path 111 in a section L between the first sealing cup 161 and the supply flow path 111. Therefore, although the piston 120 is moved, almost no braking pressure may be generated in the first hydraulic chamber 114 till the section L before the cut-off hole 126 passes the first sealing cup 161.

After the cut-off hole 126 passes the first sealing cup 161 when the piston 120 is moved, the working fluid of the first hydraulic chamber 114 may be blocked from flowing to the supply flow path 111 through the piston chamber 124 and the cut-off hole 126. Therefore, after the cut-off hole 126 passes the first sealing cup 161, the movement of the piston 120 may generate braking pressure in the first hydraulic chamber 114. At this time, the braking pressure of the first hydraulic chamber 114 may be transferred to a braking unit (not illustrated) such as a caliper of a wheel through a discharge port (not illustrated) of the piston 120, thereby braking the wheel.

The plurality of cut-off holes 126 may be formed along the circumferential direction of the piston chamber 124. Therefore, the working fluid of the piston chamber 124 may be discharged in the radial direction of the piston 120.

A second sealing cup 162 may be installed on the inner surface of the second hydraulic chamber 115 at the opposite side of the first sealing cup 161 based on the supply flow path 111. The second sealing cup 162 may prevent the working fluid of the first hydraulic chamber 114 from leaking to the outside of the cylinder 110. The second sealing cup 162 may have a U-shaped cross-section of which the opened portion faces the first hydraulic chamber 114.

The operation of the brake apparatus for a vehicle in accordance with the embodiment of the present invention will be described.

Figure 4:
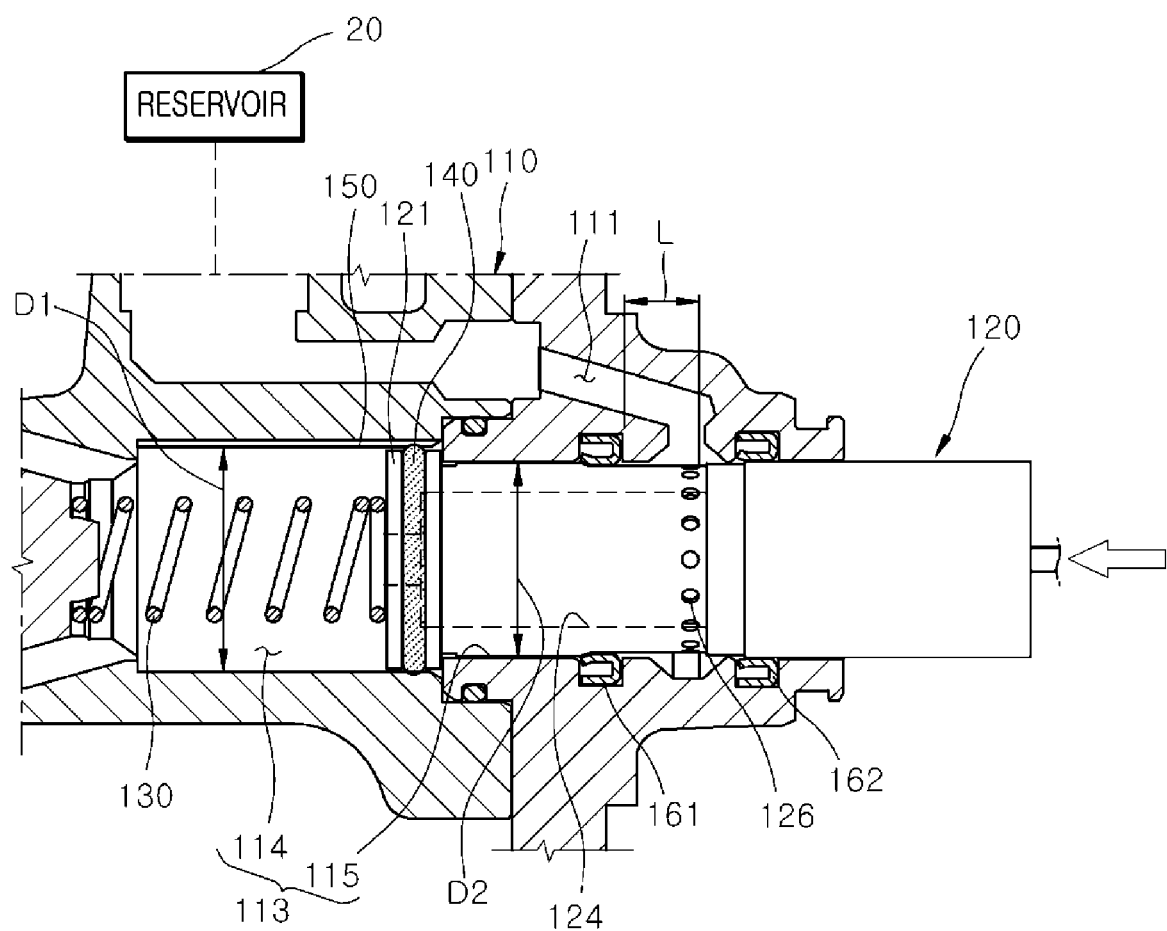
FIG. 4 is a cross-sectional view illustrating that a piston is pressurized when a brake pedal is stepped on in the brake apparatus for a vehicle in accordance with the embodiment of the present invention.
Figure 5:
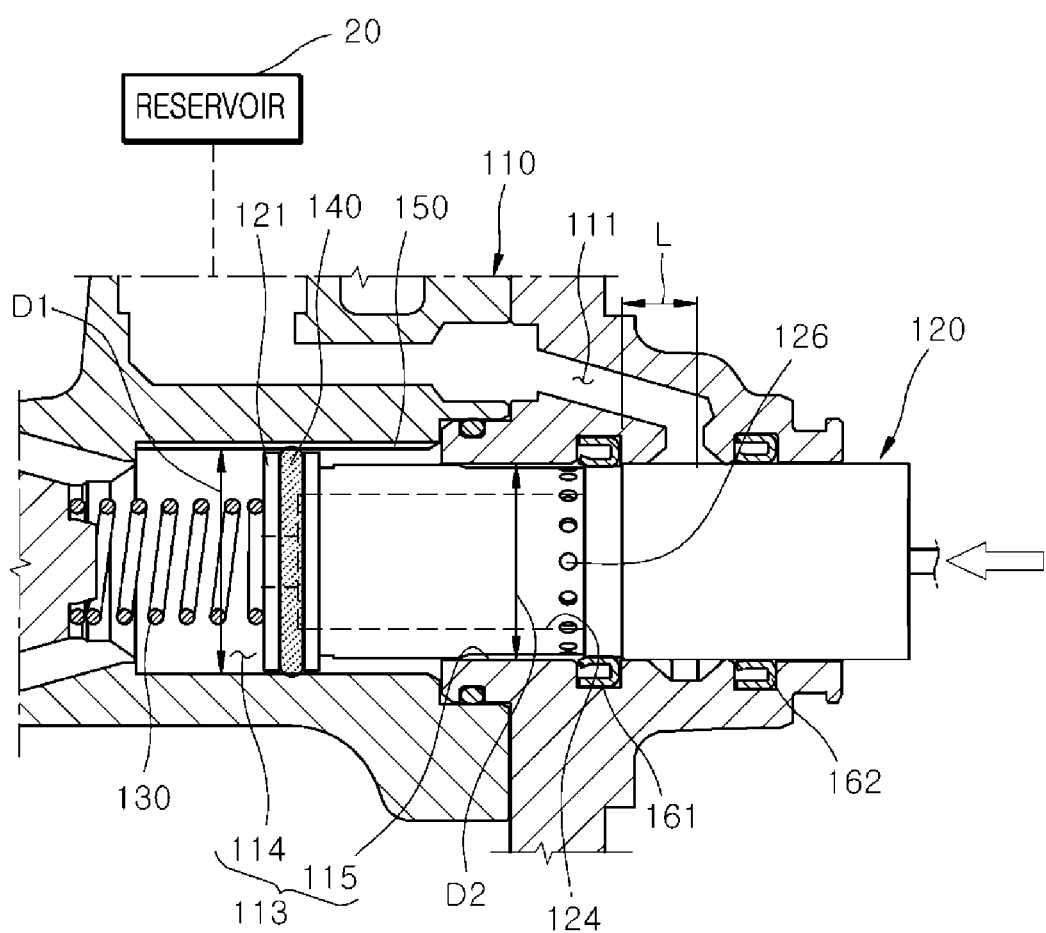
FIG. 5 is a cross-sectional view illustrating that cut-off holes of the piston pass a first sealing cup when the brake pedal is stepped on in the brake apparatus for a vehicle in accordance with the embodiment of the present invention.
Figure 6:
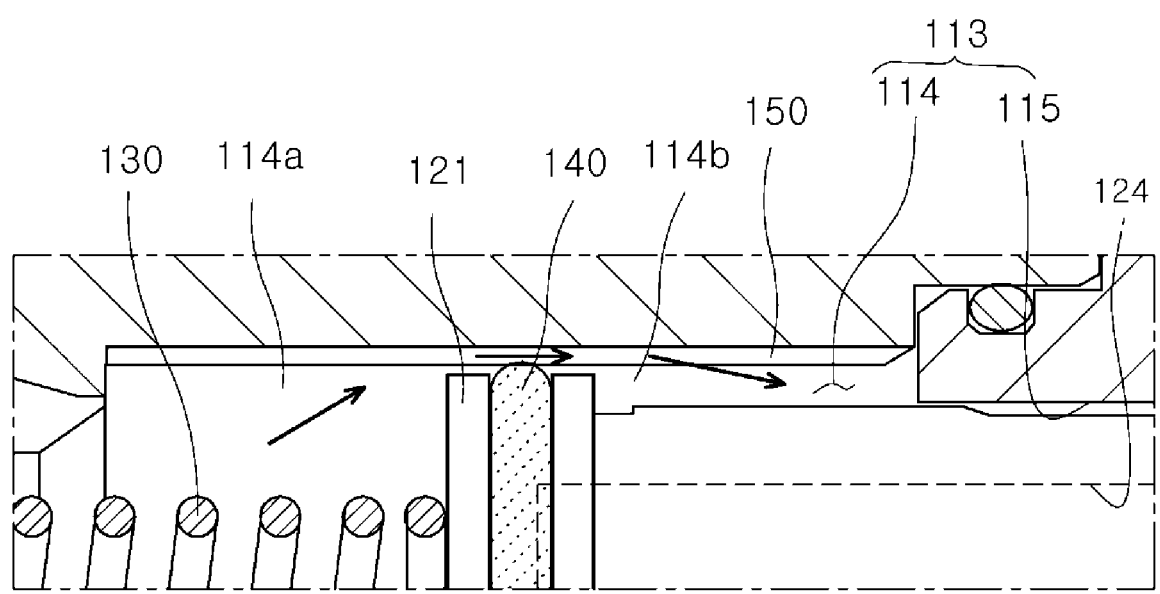
FIG. 6 is an expanded cross-sectional view illustrating that working fluid flows to a second space through the communication flow path when the brake pedal is stepped on in the brake apparatus for a vehicle in accordance with the embodiment of the present invention.
Figure 7:
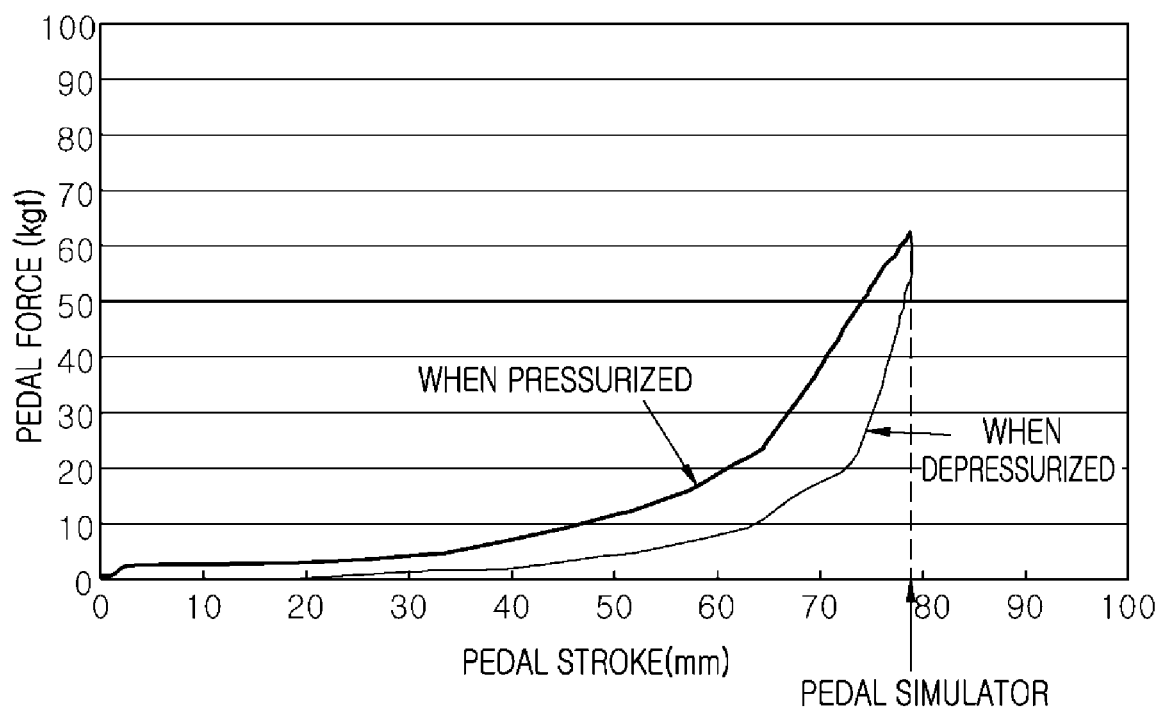
FIG. 7 is a graph illustrating a difference in pedal force between the brake pedal is pressurized and when the brake pedal is depressurized, in the brake apparatus for a vehicle in accordance with the embodiment of the present invention.

FIG. 4 is a cross-sectional view illustrating that the piston is pressurized when the brake pedal is stepped on in the brake apparatus for a vehicle in accordance with the embodiment of the present invention, FIG. 5 is a cross-sectional view illustrating that the cut-off holes of the piston pass the first sealing cup when the brake pedal is stepped on in the brake apparatus for a vehicle in accordance with the embodiment of the present invention, FIG. 6 is an expanded cross-sectional view illustrating that working fluid flows to the second space through the communication flow path when the brake pedal is stepped on in the brake apparatus for a vehicle in accordance with the embodiment of the present invention, and FIG. 7 is a graph illustrating a difference in pedal force between the brake pedal is pressurized and when the brake pedal is depressurized, in the brake apparatus for a vehicle in accordance with the embodiment of the present invention.

Referring to FIGS. 4 to 7, when a driver steps on the brake pedal 10, the piston 120 may be moved toward the first hydraulic chamber 114 of the cylinder 110 by a pedal force of the brake pedal 10. At this time, the working fluid of the first hydraulic chamber 114 may be introduced into the second space 114b through the communication flow path 150. Furthermore, until the cut-off hole 126 of the piston 120 passes the first sealing cup 161, the working fluid of the first hydraulic chamber 114 may be discharged to the supply flow path 111 through the piston chamber 124 and the cut-off hole 126. Therefore, since almost no braking pressure is formed in the first hydraulic chamber 114 before the cut-off hole 126 passes the first sealing cup 161 when the piston 120 is moved, the section L may become an invalid stroke section, before the cut-off hole 126 passes the first sealing cup 161.

Therefore, when an electric booster (not illustrated) of a master cylinder (not illustrated) cannot be operated due to a breakdown, braking pressure may be formed in the first hydraulic chamber 114 after the cut-off hole 126 passes the first sealing cup 161. Thus, although the braking stroke is lengthened, a solenoid valve does not need to be installed on the flow path between the reservoir and the cylinder 110.

When the cut-off hole 126 passes the first sealing cup 161 through the pedal force of the brake pedal 10, the first sealing cup 161 seals the space between the outer surface of the piston 120 and the second hydraulic chamber 115, thereby preventing the working fluid of the first hydraulic chamber 114 and the piston chamber 124 from being discharged to the outside of the piston 120 through the cut-off hole 126. Furthermore, the working fluid of the first space 114a of the first hydraulic chamber 114 may be introduced into the second space 114b through the communication flow path 150. As the piston 120 is moved toward the first hydraulic chamber 114, the first space 114a may be decreased, and the second space 114b may be increased.

At this time, since the first hydraulic chamber 114 is divided into two spaces 141a and 141b based on the sealing member 140 when the piston 120 is moved, the piston 120 may be moved toward the first hydraulic chamber 114 when the brake pedal 10 is pressurized. Therefore, since the working fluid of the first hydraulic chamber 114 flows to the second space 114b through the communication flow path 150, the working fluid may cause sliding resistance on the piston 120, or apply a damping force to the piston 120 to delay the movement of the piston 120. At this time, since the elastic force of the elastic member 130 and the damping force of the second space 114b are applied to the piston 120 at the same time, the driver may feel a larger force than the elastic force of the elastic member 130 when the piston 120 is pressurized.

When the pressurization of the brake pedal 10 is removed, the piston 120 may be moved toward the second hydraulic chamber 115 (right in FIG. 2). Therefore, since the working fluid of the second space 114b flows to the first space 114a of the first hydraulic chamber 114 through the communication flow path 150, the working fluid may also cause sliding resistance on the piston 120 or apply a damping force to the piston 120 to delay the return of the piston 120, when the piston 120 is returned to the original position. At this time, since the restoring force of the elastic member 130 is attenuated by the damping force of the second space 114b, the driver may feel a smaller force than the elastic force of the elastic member 130 when the piston 120 is depressurized.

Therefore, since a hysteresis characteristic in which a difference in pedal feel (pedal force) is caused when the brake pedal 10 is pressurized and depressurized is implemented, the driver can easily feel the difference in pedal feel, thereby easily operating the brake pedal 10.

In accordance with the embodiment of the present invention, since the working fluid of the first hydraulic chamber flows to the first and second spaces through the communication flow path when the piston is pressurized and depressurized, the driver may feel a larger force than the elastic force of the elastic member when the piston is pressurized, and feel a smaller force than the restoring force of the return spring when the piston is depressurized. Therefore, since a hysteresis characteristic in which a difference in pedal feel (pedal force) is caused when the brake pedal is pressurized and depressurized is implemented, the driver can easily feel the difference in pedal feel, thereby easily operating the brake pedal.

Furthermore, until the cut-off hole of the piston passes the first sealing cup, the working fluid of the first hydraulic chamber may be discharged to the supply flow path through the piston chamber and the cut-off hole. Therefore, when the piston is moved, almost no braking pressure may be formed in the first hydraulic chamber, before the first sealing cut passes the cut-off hole. Thus, when the electric booster of the master cylinder is not operated (in case of operation fail), braking pressure may be formed in the first hydraulic chamber after the cut-off hole passes the first sealing cup. Therefore, although the braking stroke is lengthened, a solenoid valve does not need to be installed on a flow path on the reservoir and the cylinder.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:
1. A brake apparatus for a vehicle, comprising:
a cylinder comprising a supply flow path configured to supply working fluid of a reservoir and a hydraulic chamber connected to the supply flow path;
a piston movably installed in the cylinder, and connected to a brake pedal;
an elastic member installed in the hydraulic chamber so as to elastically support the piston;
a sealing member installed on the outer surface of the piston so as to be in contact with the inner surface of the hydraulic chamber; and
a communication flow path formed on the inner surface of the cylinder along the longitudinal direction of the cylinder, which guides the working fluid of the hydraulic chamber to the opposite side of the moving direction of the piston, when the piston is moved,
wherein:
the hydraulic chamber comprises:
a first hydraulic chamber accommodating an end portion of the piston, and having the communication flow path formed therein; and
a second hydraulic chamber having an inner diameter less than an inner diameter of the first hydraulic chamber, and connected to the supply flow path;
the sealing member has a larger size than the inner diameter of the first hydraulic chamber and the outer diameter of a division ring of the piston;
the sealing member divides the first hydraulic chamber into a first space and a second space when the piston is moved; and
the working fluid of the first hydraulic chamber flows to the first and second spaces through the communication flow path when the piston is pressurized and depressurized.

2. The brake apparatus of claim 1, wherein, when the piston is pressurized by the brake pedal, the first space in the first hydraulic chamber is gradually decreased and the second space in the first hydraulic chamber is gradually increased.

3. The brake apparatus of claim 1, wherein:
the piston comprises the division ring protruded from the end portion thereof; and
the sealing member is installed on the division ring.

4. The brake apparatus of claim 1, wherein:
a first sealing cup is installed on the inner surface of the second hydraulic chamber between the supply flow path and the first hydraulic chamber;
the piston has a piston chamber that communicates with the first hydraulic chamber; and
the piston chamber has a cut-off hole that communicates with the supply flow path.

5. The brake apparatus of claim 4, wherein the cut-off hole is formed in plurality along the circumferential direction of the piston chamber.

6. The brake apparatus of claim 4, wherein the cut-off hole is configured to cause the working fluid of the piston chamber to flow toward the supply flow path in a section between the first sealing cup and the supply flow path.

7. The brake apparatus of claim 6, further comprising a second sealing cup installed on the inner surface of the second hydraulic chamber at a side opposite that of the first sealing cup based on the supply flow path.

* * * * *